US012453973B2

(12) United States Patent
Urbinatti et al.

(10) Patent No.: US 12,453,973 B2
(45) Date of Patent: Oct. 28, 2025

(54) CRUSHER COMPRISING REPLACEABLE PROTECTIVE LINERS

(71) Applicant: Metso Sweden AB, Trelleborg (SE)

(72) Inventors: Victor Urbinatti, Waukesha, WI (US); Henrik Persson, Trelleborg (SE); Fredrik Larsson, Malmö (SE)

(73) Assignee: METSO FINLAND OY, Espoo (FI)

( * ) Notice: Subject to any disclaimer, the term of this patent is extended or adjusted under 35 U.S.C. 154(b) by 0 days.

(21) Appl. No.: 16/091,655

(22) PCT Filed: Apr. 8, 2016

(86) PCT No.: PCT/EP2016/057752
§ 371 (c)(1),
(2) Date: Oct. 5, 2018

(87) PCT Pub. No.: WO2017/174147
PCT Pub. Date: Oct. 12, 2017

(65) Prior Publication Data

US 2019/0118185 A1 Apr. 25, 2019

(51) Int. Cl.
*B02C 2/00* (2006.01)

(52) U.S. Cl.
CPC .......... *B02C 2/005* (2013.01); *B02C 2210/02* (2013.01)

(58) Field of Classification Search
CPC ............................ B02C 2/005; B02C 2210/02
USPC ...................................................... 241/285.1
See application file for complete search history.

(56) References Cited

U.S. PATENT DOCUMENTS

| | | | | |
|---|---|---|---|---|
| 2,135,324 | A * | 11/1938 | Peter | B02C 2/04 241/215 |
| 2,860,837 | A | 11/1958 | Werner | |
| 2,971,705 | A * | 2/1961 | Werner | B02C 2/04 241/300 |
| 3,302,896 | A | 2/1967 | Hansjorg et al. | |
| 3,503,564 | A | 3/1970 | Adam | |

(Continued)

FOREIGN PATENT DOCUMENTS

| | | |
|---|---|---|
| CA | 1135230 A | 11/1982 |
| CN | 101646497 A | 2/2010 |

(Continued)

OTHER PUBLICATIONS

International Search Report for PCT/EP2016/057752, dated Feb. 15, 2017.

(Continued)

*Primary Examiner* — Bobby Yeonjin Kim
*Assistant Examiner* — P Derek Pressley
(74) *Attorney, Agent, or Firm* — Andrus Intellectual Property Law, LLP

(57) ABSTRACT

A crusher comprises at least one protective liner which is releasably fitted within the crusher so as to protect a structural element of the crusher which is subject to wear due to its contact with material passing the crushing gap, at least a part of an outwardly directed surface of the protective liner constituting a wear surface. The at least one protective liner comprises an elastic material layer and wear resistant inserts retained by the elastic material layer, wherein outwardly directed surfaces of the wear resistant inserts form part of the wear surface of the protective liner.

10 Claims, 9 Drawing Sheets

(56) References Cited

U.S. PATENT DOCUMENTS

| | | | | |
|---|---|---|---|---|
| 3,804,346 | A * | 4/1974 | Norman | B02C 17/225 241/300 |
| 3,834,633 | A | 9/1974 | Dougall et al. | |
| 3,966,130 | A | 6/1976 | Doty | |
| 4,065,064 | A * | 12/1977 | Anthony | B02C 2/005 241/300 |
| 4,168,036 | A * | 9/1979 | Werginz | B02C 2/047 241/207 |
| 4,761,317 | A | 8/1988 | Ebata et al. | |
| 4,886,218 | A * | 12/1989 | Bradley | B02C 2/005 241/294 |
| 6,036,127 | A | 3/2000 | Moller | |
| 2005/0269436 | A1 * | 12/2005 | Sawant | B02C 2/04 241/215 |
| 2006/0086852 | A1 | 4/2006 | Juhlin | |
| 2008/0135659 | A1 | 6/2008 | Condon et al. | |
| 2013/0075508 | A1 * | 3/2013 | Stemper | B02C 2/04 241/207 |
| 2013/0299618 | A1 * | 11/2013 | Sharman | B02C 1/10 241/300 |
| 2015/0283549 | A1 * | 10/2015 | Malmqvist | B02C 17/22 241/207 |
| 2015/0314300 | A1 * | 11/2015 | Malmqvist | B02C 2/007 241/285.2 |
| 2016/0236198 | A1 * | 8/2016 | Nikolic | B02C 2/005 |

FOREIGN PATENT DOCUMENTS

| | | | |
|---|---|---|---|
| CN | 102834034 | A | 12/2012 |
| CN | 203577861 | U | 5/2014 |
| CN | 104549618 | A | 4/2015 |
| EP | 2535110 | A1 | 12/2012 |
| EP | 2859949 | A1 | 4/2015 |
| EP | 2929940 | A1 | 10/2015 |
| FR | 2137461 | A1 | 12/1972 |
| SU | 342666 | A1 | 6/1972 |
| SU | 631195 | A1 | 11/1978 |
| WO | 2006132582 | A1 | 12/2006 |
| WO | 2008087247 | A1 | 7/2008 |

OTHER PUBLICATIONS

Search Report and Office Action issued in corresponding Russian Application No. 2018139066 mailed Oct. 31, 2019.

Office Action and Search Report for corresponding Chinese Patent Application No. 202011131977.9 issued Aug. 12, 2021.

* cited by examiner

CRUSHER COMPRISING REPLACEABLE PROTECTIVE LINERS

CROSS-REFERENCE TO RELATED APPLICATIONS

This application is the U.S. national stage application of International Application PCT/EP2016/057752 filed Apr. 8, 2016, which international application was published on Oct. 12, 2017, as International Publication WO 2017/174147 in the English language.

FIELD OF THE INVENTION

The present invention relates to crushers such as gyratory crushers and cone crushers, and more particularly to protective liners used in crushers.

Crushers such as cone crushers and gyratory crushers are rock crushing systems, which generally break apart rock, stone, ore or other material in a crushing gap between a stationary part of the crusher frame and a moving crushing head. The crushing head gyrates about a vertical axis within a stationary shell which is part of a main frame of the crusher. To impart the gyratory motion to the crushing head, the crushing head is e.g. assembled surrounding an eccentric that rotates about a fixed shaft. The eccentric can be driven by a pinion and countershaft assembly.

The gyratory motion of the crushing head with respect to the stationary shell crushes rock, stone or other material as it travels through the crushing gap. The crushed material exits the crusher through the bottom of the crusher.

Due to the material passing the crusher and being crushed in the crushing gap, certain structural elements within such crushers, including e.g. the inner wall of a bottom shell of the main frame of the crusher below the actual crushing chamber, are subject to extensive wear.

PRIOR ART

In conventional crushers, those structural elements which are subject to wear are made from steel or clad with steel. If they are worn to a certain extent, the wear parts have to be exchanged, or the steel lining has to be replaced. In some cases, this creates substantial downtimes because the crushers have to be taken apart entirely.

U.S. Pat. No. 2,860,837 mentions an inner frame liner which is welded to an inner surface of the wall of the frame at points about the upper circumference of the liner.

Apart from such welded connections, releasable fixing structures for frame liners have been known in the art. As an example, U.S. Pat. No. 4,065,064 discloses a wear resistant lining for the inside wall of the bottom shell of a gyratory crusher which includes a plurality of flat plates made out of wear resistant steel plate and each having a pair of spaced apart holes therein. The plates are placed on the inside of the bottom shell of a gyratory crusher adjacent to each other to encircle the inside of the bottom shell. The plates are fitted with fasteners which pass through the holes in the plates and holes in the bottom shell.

EP-A1-2 859 949 describes a gyratory crusher in which a main shaft and a lower bearing are mounted within a central hub supported at a bottom shell of the crusher by radially extending arms. A modular wear resistant liner protects both the internal surface of the bottom shell and the support arms from material as it falls through the bottom shell. The liner elements are secured to an inner surface of the shell via respective attachment bolts.

SUMMARY OF THE INVENTION

It is the object underlying the present invention to provide a crusher comprising a protective liner which is easy to install and therefore also easy to replace, while providing for a longer wear life than conventional steel liners. The present invention also aims at providing a protective liner for use in such a crusher, which is e.g. a gyratory or cone crusher.

This object is achieved by means of a crusher and the protective liner of the present disclosure.

The crusher comprises a main frame and a crushing head mounted upon a main shaft. A crushing gap is formed between an outer surface of the crushing head and an inner circumferential surface of a mantle mounted within the main frame. The crusher further comprises at least one protective liner which is releasably fitted within the crusher, at least a part of an outwardly directed surface of the protective liner constituting a wear surface.

The protective liner is provided so as to protect a structural element of the crusher which is subject to wear due to its contact with material being processed in the crusher.

Due to the releasable fitting of the protective liner, the protective liner can be replaced quite easily and quickly.

According to the invention, the at least one protective liner comprises an elastic material layer and wear resistant inserts retained by the elastic material layer, wherein outwardly directed surfaces of the wear resistant inserts form part of the wear surface of the protective liner.

The material of the elastic material layer can be a polymer material, particularly an elastomer material, such as rubber, isoprene, polybutadiene, butadiene, nitrile, ethylene, propylene, chloroprene or silicone rubber, or a mixture thereof, including filling or auxiliary materials and impurities max. 30% by volume.

The inserts can be metallic or ceramic inserts or made from a cermet composite. If metallic, they can be of an iron based metal, including metallic carbides or oxides in a proportion of 10-40% by volume. If ceramic, they can consist of carbides or oxides of metallic elements, such as aluminum, titanium, tantalum, wolfram, chromium or zirconium or of mixtures thereof. If cermet, they can include carbides or oxides of metallic elements, such as aluminum, titanium, tantalum, wolfram, chromium or zirconium or a mixture thereof and of a metallic binder, said binder being of a plain metal or a metal alloy and having cobalt, nickel or iron as the main component of the binder.

The wear-resistant inserts can be arranged in rows in the outwardly directed surface of the elastic material layer. Every second wear-resistant member can be offset relative to the neighboring wear-resistant members in the same row.

The mutual proportions of the elastic material and the wear-resistant inserts depend on the wear conditions and the location and manner of attachment of the protective liner within the crusher. According to one embodiment, the wear-resistant inserts can be arranged and distributed about the elastic material layer so that the outwardly directed surface of at least one area of the protective liner mainly consists of the wear-resistant members.

The wear resistant inserts can be attached to the elastic material layer by vulcanizing, e.g. by vulcanizing ceramic inserts into a layer of polymer based material. Alternatively or in addition, the wear resistant inserts can be retained within the elastic material layer mechanically by means of a press fit and/or a form fit.

In general terms, the combination between wear-resistant, e.g. ceramics elements and an elastic, e.g. rubber layer is advantageous insofar as ceramics are mainly adapted to compensate for sliding or abrasive wear, whereas rubber is mainly adapted for compensating impact wear. The protective liner of the present invention thereby provides for a longer wear life than conventional steel liners. The reduction of wear will also reduce the downtimes which are needed for replacing worn parts.

Ceramic-rubber composites have been known in the art, e.g. from U.S. Pat. No. 3,607,606 which discloses a composite of rubber, natural or synthetic, and alumina-based ceramic, useful as a wear-resistant lining for ball mills, conveyors, chutes and the like. The composite comprises a layer of rubber having embedded in and bonded to the surface thereof closely spaced shaped bodies of alumina-base ceramic.

WO-A1-2006/132582 also relates to wear-resistant lining elements intended for a surface subjected to wear and which has an outwardly directed surface, over which material in the form of pieces or particles, such as crushed ore and crushed rock material, is intended to move. Chutes and truck platforms are mentioned as examples. The wear-resistant lining element comprises elastomeric material mainly adapted to absorb impact energy and wear-resistant members mainly adapted to resist wear. These are preferably made from ceramics material.

According to WO-A1-2008/087247, similar composite materials are used in wear parts of a vertical shaft impactor, e.g. distributor plates.

In order to fasten the protective liner of the invention to the crusher to protect a certain structural element from wear, several different possibilities exist.

On the one hand, the protective liner can be releasably fastened within the crusher by fastening the elastic material layer as such within the crusher. The elastic material layer can be releasably fastened to the crusher by any releasable fastening means known in the art, e.g. by means of a screw or bolt connection, by clamping or the like.

On the other hand, the protective liner may further comprise a carrier structure for supporting the elastic material layer, e.g. a metal carrier frame. If so, the protective liner can also be releasably fitted within the crusher by fastening the carrier structure within the crusher. The carrier structure can in turn be fastened by any releasable fastening means known in the art, e.g. by means of a screw or bolt connection, by clamping or the like, or simply by being seated onto a supporting structure, i.e. in a form-fitting manner.

The protective liner as such can possibly be relatively resilient due to the elastic properties of the elastic material layer. In order to provide a certain stiffness or rigidity to the protective liner, the protective liner can further comprise at least one reinforcing or stiffening element for providing an enhanced stiffness to the elastic material layer, particularly in the vertical direction.

According to the invention, at least a part of an outwardly directed surface of the protective liner constitutes a wear surface. An outwardly directed surface is a surface of the protective liner which is exposed within the crusher and therefore exposed to contact with material passing the crusher. Outwardly directed surfaces of the wear resistant inserts form part of the wear surface of the protective liner. Areas of the protective liner outside of this wear surface can, however, be devoid of any wear-resistant inserts. For example, an area near an upper edge and/or an area near a lower edge of the protective liner can be devoid of wear-resistant inserts. At least one of such areas can then suitably be used for fastening the protective liner within the crusher.

The crusher may further comprise a steel liner arranged so as to cover and protect a structural element of the crusher which is subject to wear. This can be a steel liner as it is conventionally used in crushers, e.g. a steel liner provided to an inner circumferential surface of a bottom shell of the crusher. The protective liner of the invention is then fixed to the steel liner. When the protective liner is worn, the protective liner can be replaced by a new one, while the steel liner can remain in place.

The steel liner may be integrally formed with or provided with supporting structures for supporting the protective liner during assembly and/or during operation of the crusher. For example, hooks may be welded onto the steel liner to support the protective liner during installation.

If the protective liner is fastened to a steel liner, a surface area of the protective liner may be smaller than a surface area of the steel liner, so that the protective liner covers only part of the surface area of the steel liner. This is due to the fact that the surface areas of existing steel liners are usually larger than the actual wearing zone, whereas the protective liner of the invention or its wear surface, respectively, basically covers only the actual wearing area. As a consequence, the protective liner will be worn across substantially its entire wear surface so that the maximum possible use is made of the protective liner. This reflects one possible use of the protective liner of the present invention, i.e. to add the protective liner to those portions of a steel liner which are subject to the most extensive wear.

As regards the configuration of the protective liner, the liner may be provided as one single part, or it may be assembled from several protective liner sections which are preferably arranged adjacent to each other or even coupled to each other in one way or the other.

Protective liners according to the present invention can be provided to specific locations within a crusher.

At least one protective liner can be a bottom shell liner mounted to the inner circumferential surface of a bottom shell of the main frame. Conventionally, mainframes or the shells thereof, respectively, are lined with steel. The bottom shell liner of the invention may be added to an existing steel liner of the bottom shell, or used instead of a steel liner.

Considering that the crusher will further comprise a drive shaft (countershaft) arranged to impart the gyratory motion to the crusher head, and a bottom shell of the main frame will comprise a shaft opening for the drive shaft to pass through, at least one protective liner may be a drive shaft liner mounted so as to surround a portion of the drive shaft from above. The portion of the driveshaft which is protected by the drive shaft liner extends within the crusher and is therefore subject to being hit by material having passed the crushing gap. The drive shaft liner of the invention may also be added to an existing steel cover of the drive shaft.

If the main shaft of the crusher is mounted within a central hub, at least one section of the driveshaft liner can be arranged adjacent to, and preferably fixed to, the central hub.

The driveshaft liner may include a first section extending along a portion of the drive shaft extending within the bottom shell. Further sections can be added which also extend along the drive shaft, or e.g. extend perpendicular thereto.

Considering that the main shaft can be coupled with the crushing head via a locking nut provided at an upper end of the main shaft, at least one protective liner can also be a locking nut liner provided on an outer circumferential surface of the locking nut. The locking is a quite expensive structural part of the crusher and may therefore suitably be protected by means of a protective liner of the invention.

The crusher of the invention can for example be a gyratory crusher or a cone crusher.

Finally, the present invention also provides a protective liner for a crusher as described above.

BRIEF DESCRIPTION OF THE DRAWINGS

The above, as well as additional objects, features and advantages of the present invention will be better understood through the following illustrative and non-limiting detailed description of preferred embodiments of the present invention, with reference to the appended drawing, where the same reference numerals will be used for similar elements, wherein.

DESCRIPTION OF EMBODIMENTS OF THE INVENTION

Embodiments of protective liners according to the present invention will now be described in detail with reference to the drawings.

Figure 1:
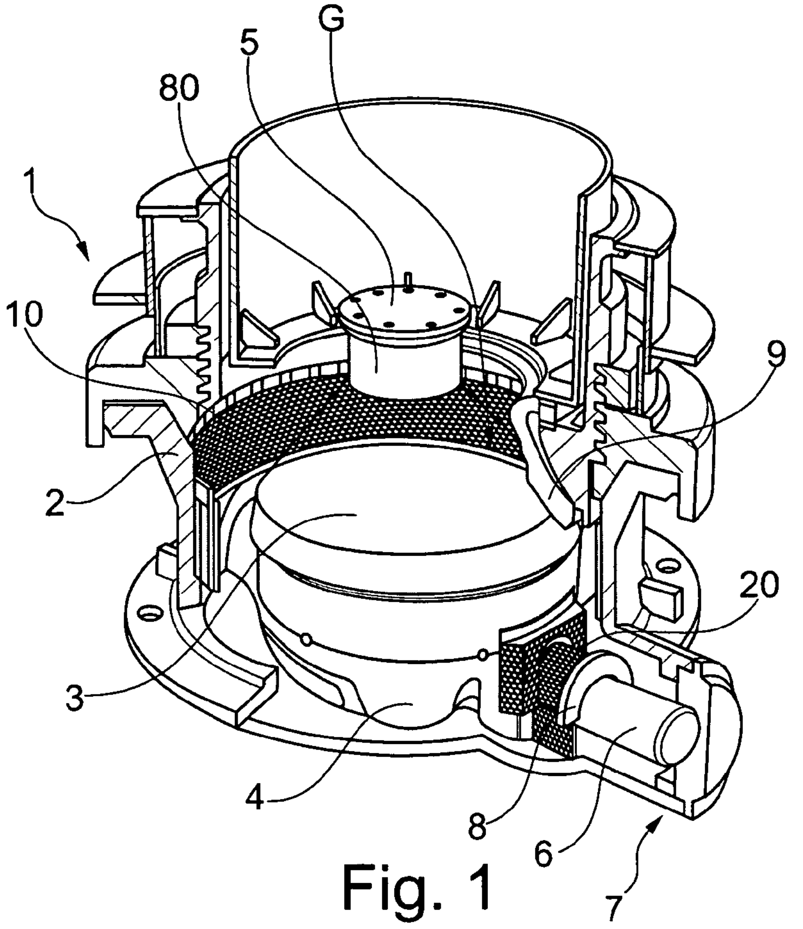
FIG. 1 shows schematically a crusher equipped with protective liners according to the present invention.

FIG. 1 schematically illustrates a crusher in section. The crusher comprises a main frame 1 which is assembled from several parts, including a top shell and a bottom shell designated 2. A crushing head 3 is mounted upon a vertically extending main shaft (not illustrated). At its lower end, the main shaft is mounted within a central hub 4. At its upper end, the main shaft is coupled with the crushing head 3 via a locking nut 5.

A crushing gap G is formed between an outer surface of the crushing head 3 and an inner circumferential surface of a mantle 9 assembled within the main frame 1. The crushing head is supported so as to perform a gyratory motion relative to the inner circumferential surface of the mantle 9. The material to be crushed is fed via the top of the crusher and is crushed in the crushing gap G between the outer surface of the crushing head 3 and the inner surface of the surrounding mantle 9. The crushed material is discharged from the bottom of the crusher.

During operation, the crushing head 3 performs a gyratory motion. A drive shaft 6 is arranged to impart the gyratory motion to the crusher head 3. This is done, in a manner known as such, by means of an eccentric arrangement (not illustrated) provided on the inside of the crushing head 3. Reference numeral 7 designates a shaft opening formed in the bottom shell 2 for the drive shaft 6 to pass through.

In accordance with the invention, the crusher illustrated in FIG. 1 is equipped with protective liners to protect surfaces within the crusher which are subject to wear due to their contact with the material being processed in the crusher. Each of the protective liners includes an elastic material layer which has wear-resistant parts embedded at least in a surface area thereof which forms a wear surface. Each wear resistant part has an outwardly directed surface forming part of the wear surface of the protective liner. The remainder of each wear resistant part is immersed in the elastic material layer. As explained further above, the elastic material layer can be a polymer layer, and the wear-resistant parts can be ceramic inserts. One possible implementation would be a layer made from a composite polymer-ceramics material. Therefore, the wear surface of the protective liner will also be referred to as a "polymer-ceramics layer" in the following.

A first protective liner 10 is mounted to the inner circumferential surface of the bottom shell 2, with a steel liner being interposed between the inner circumferential surface of the bottom shell 2 and the protective liner 10.

Reference numeral 8 designates a steel cover of the driveshaft. This steel cover surrounds the drive shaft 6, at least from above, in the area between the inner circumference of the bottom shell 2 and the outer circumference of the central hub 4, i.e. in the area where the drive shaft 6 is exposed to material which has passed the crushing gap G. The steel cover 8 terminates in a first collar adjacent to the bottom shell 2, which is visible in the Figure, and a second collar adjacent to the central hub 4, which is hidden from view. A second protective liner 20 is mounted so as to surround a portion of the drive shaft 6—or the steel cover 8 covering the drive shaft 6, respectively—from above.

A third protective liner 80 is provided on an outer circumferential surface of the locking nut 5.

These protective liners will now be described in detail.

1. Bottom Shell Liner

Figure 2:
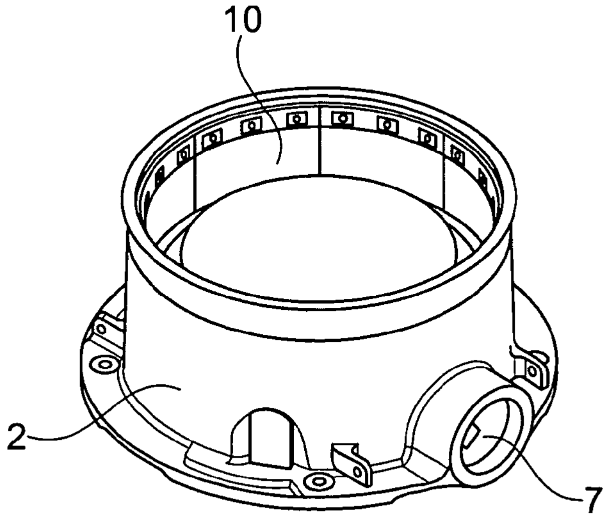
FIG. 2 is a perspective view of a bottom shell of a crusher, equipped with a protective liner of the invention.
Figure 3:
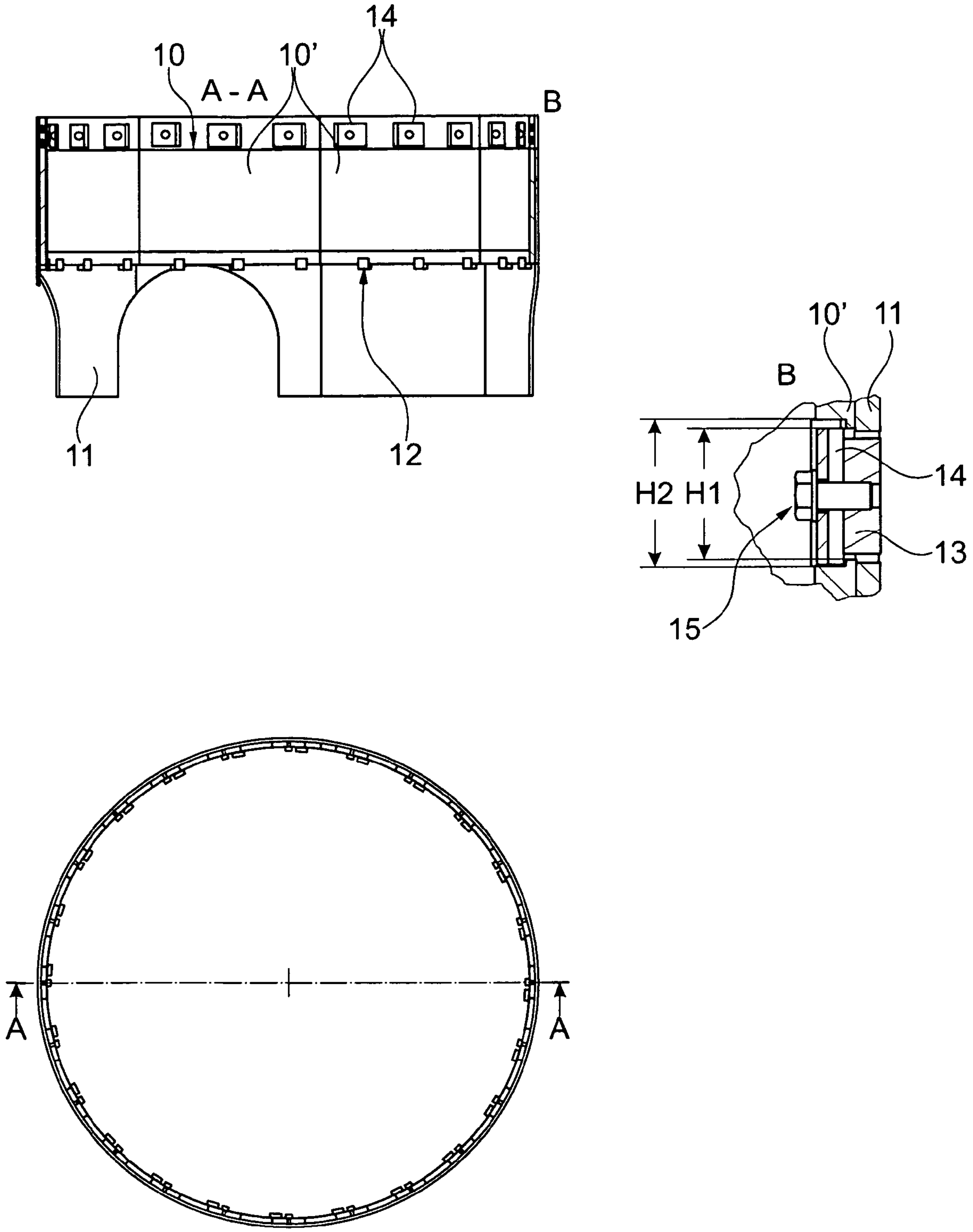
FIG. 3 illustrates a steel liner and a protective liner used for the bottom shell of FIG. 2.

The protective liner 10 on the inner circumferential surface of the bottom shell 2 is illustrated in FIGS. 2 to 4.

FIG. 2 is a perspective view of the bottom shell 2 equipped with the protective liner 10. The bottom shell liner 10 is provided on the inner circumferential surface of the bottom shell 2, i.e. in an area below the mantle 9 (cf. FIG. 1) defining the crushing gap G. More particularly, the bottom shell liner 10 is made up from several sections 10' arranged adjacent to each other about the inner wall of the bottom shell 2, so that the sections 10' together define a cylindrical shape. The protective liner sections 10' are fitted to a steel liner which clads the inner circumferential surface of the bottom shell 2, much like the steel liners used in the prior art.

The steel liner and the bottom shell liner 10 are illustrated in more detail in FIG. 3, which includes a top view of the steel liner, designated 11, to which the sections 10' forming the bottom shell liner 10 are fitted. The Figure also includes a sectional view along the line A-A in the top view, and an enlarged illustration of a detail designated B in the sectional view.

As shown in the sectional view, protruding hooks 12 are provided to the inner circumferential surface of the steel liner 11, e.g. by welding. These hooks 12 support the protective liner sections 10' during assembly by engaging lower edges of the protective liner sections 10'. In this embodiment, the hooks 12 are spaced apart regularly about the inner circumference of the steel liner 11.

It becomes apparent from the drawing that a surface area of the protective liner 10 is smaller than a surface area of the steel liner 11, i.e. the protective liner 10 covers only part of the surface area of the steel liner 11. The surface area of the steel liner 11 is larger than the actual wearing zone, whereas the protective liner 10 or its wear surface, respectively, basically covers the actual wearing area. As a consequence, the protective liner 10 will be worn across substantially its entire wear surface so that the maximum possible use is made of the protective liner 10. In a way, it can be said that the protective liner 10 protects the steel liner 11 which in turn protects the bottom shell 2.

In an area near the upper edge of the bottom shell liner 10, a series of through openings are provided to the sections 10', which are spaced apart from each other in regular intervals about the circumference of the bottom shell liner 10. The through openings have a rectangular shape in this embodiment. In this embodiment, the number and spacing of the through openings corresponds to the number and spacing of the hooks 12, but this must not necessarily be the case.

On the inner circumferential surface of the steel liner 11, protruding portions are formed, which have a shape corresponding to the shape of the through openings in the protective liner sections 10'. The protruding portions can be added to the steel liner 11, e.g. by welding, or formed as an integral part with the steel liner 11, e.g. by casting.

In order to assemble the protective liner sections 10' to the steel liner 11, the protective liner sections 10' are fitted to the steel liner 11 so that the lower edges of the protective liner sections 10' engage with the hooks 12 provided on the steel liner 11, while the protruding portions formed on the steel liner 11 are made to engage with the through openings formed in the protective liner sections 10'. The protective liner sections 10' are thereby coupled to the steel liner 11 both via the hooks 12 engaging with the lower edges thereof and via the protruding portions engaging with the through openings thereof.

The enlarged detailed view in FIG. 3 shows how the sections 10' of the bottom shell liner 10 are then ultimately fixed to the steel liner 11. In this detailed view, 13 designates one of the protruding portions of the steel liner 11. The protective liner section 10' has a through opening as described above. From the detailed view it becomes apparent that the through opening has a stepped configuration: on the side of the protective liner section 10' which faces the steel liner 11, the rectangular through opening has a first height H1 and a first width (not visible in the detailed view because this width extends perpendicular to the paper plane). On the side of the protective liner section 10' which faces away from the steel liner 11, the through opening has a second height H2 which is larger than the first height H1. On this side, the through opening also has a second width which is larger than its first width.

A liner clamp 14 is provided, which has a width and height larger than the first width and heigth H1 of the through opening in the protective liner section 10' but smaller than the second width and height H2 thereof, so that the liner clamp 14 contacts the stepped section within the through opening. By means of a bolt 15 which penetrates the liner clamp and is fit into the protruding portion 13 of the steel liner 11, the protective liner section 10' is clamped to the steel liner 11.

As a result, the protective liner 10 can be easily replaced, without there being the necessity to release any permanent connections such as welded connections.

Figure 4A:
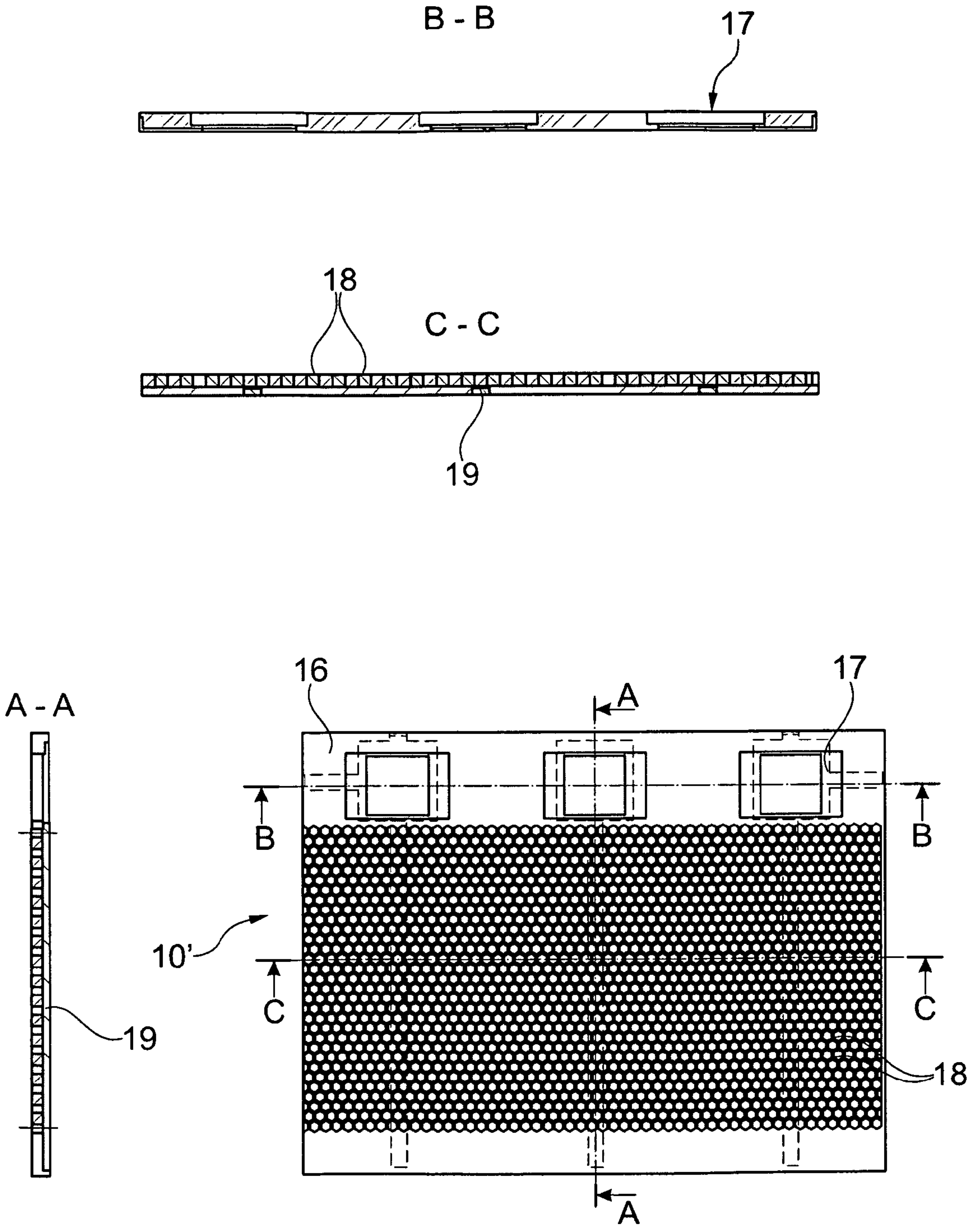
FIG. 4*a* shows the configuration of the protective liner without the steel liner.

The configuration of the bottom shell liner 10—without the steel liner 11—is apparent in more detail from FIG. 4*a*, which illustrates one of the several sections 10' of the bottom shell liner 10 in a front view and several sectional views along lines A-A, B-B and C-C of the front view. The section 10' is constituted by a rubber plate 16, which includes the aforementioned rectangular and stepped through openings near its upper edge, the through openings being designated 17 here.

Note that the protective liner section 10' is illustrated having a plane shape in the drawings according to FIG. 4*a*. In order for the section 10' to be mounted to the crusher, it will be brought into a curved shape adapted to the curvature of the structure to which it is fixed, i.e. the bottom shell 2 or the steel liner 11 provided thereon.

A multitude of ceramic inlays 18 are enclosed in the rubber material on one side of the rubber plate 16, thereby configuring a wear surface below the series of through openings 17. In the mounted state of the sections 10', the wear surface will face towards the inside of the crusher so as to be exposed to the material passing the crusher. The area near the upper edge of the rubber plate 16 which includes the through openings 17 is devoid of such ceramic inlays. A narrow area near the lower edge of the rubber plate 16 is also free from ceramic inlays.

Each wear resistant insert 18 has an outwardly directed surface forming part of the wear surface of the protective liner 10. The remainder of each insert 18 is immersed in the rubber material.

On its side opposite the ceramic inlays 18, the rubber plate is backed up by a series of vertically extending stiffening elements 19 (illustrated in dashed lines in the front view and also visible in all of the sectional views). The stiffening elements 19 are provided at the locations of the through openings 17 and are spaced apart from each other accordingly.

The stiffening elements 19 can for example be made from sheet metal. They serve for enhancing the stiffness of the liner sections 10' in the vertical direction. In the horizontal direction, the sections 10' have a certain flexibility in order for them to be brought into the curved shape as mentioned above.

Figure 4B:
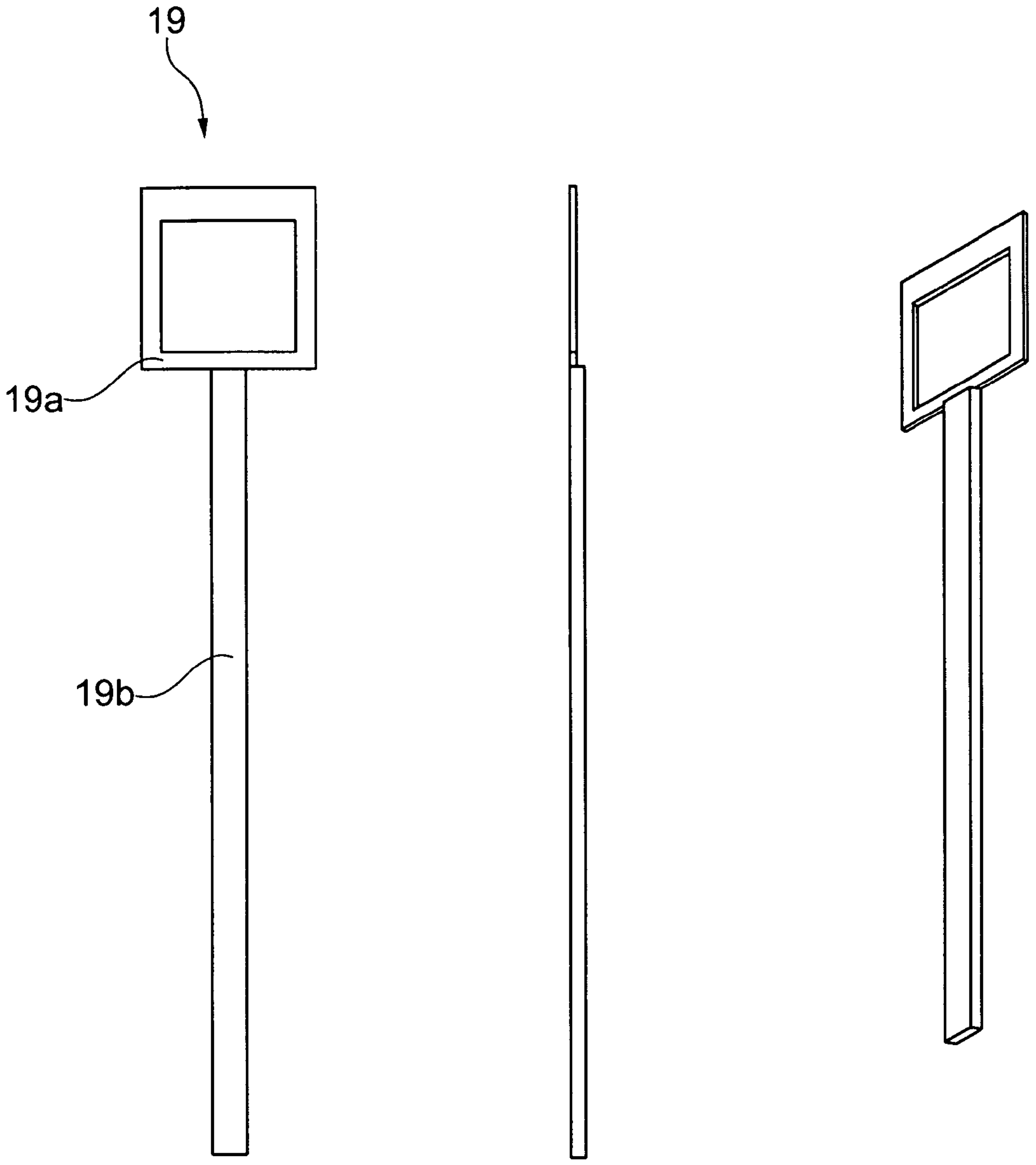
FIG. 4*b* is a front view, side view and perspective view of a vertical stiffening member.

FIG. 4*b* shows one of the stiffening elements 19 in a front view, side view and perspective view. The stiffening element includes a first, frame-shaped part 19*a* having an approximately square outline and intended to be positioned surrounding one of the through holes 17 in the manner illustrated in FIG. 4*a*. The stiffening element 19 also includes a narrow strut-shaped second part 19*b* extending vertically downwards from the first part 19*a*. In this embodiment, the second part 19*b* extends essentially to the lower edge of the liner section 10', and the material thickness of the second part 19*b* is larger than the material thickness of the frame-shaped first part 19*a*.

2. Drive Shaft Liner

Figure 5:
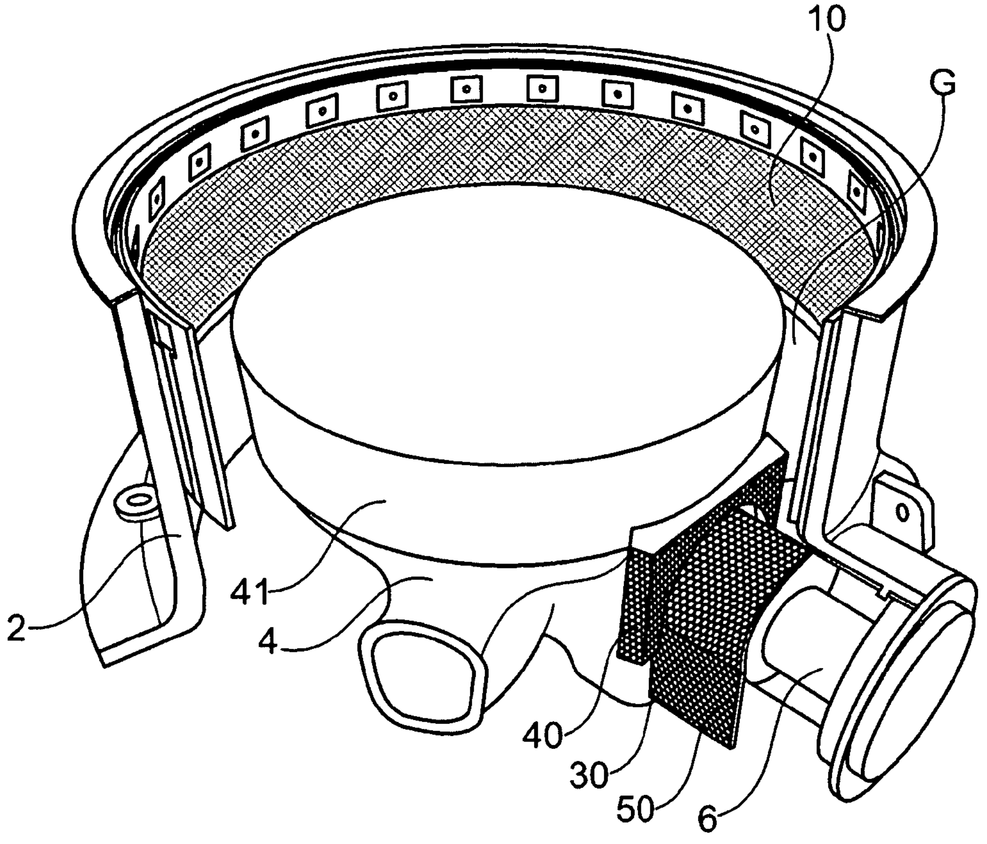
FIG. 5 is a perspective view of a bottom shell of a crusher equipped with a bottom shell liner and a driveshaft liner of the invention.

FIG. 5 is another perspective partial view of a crusher. The crusher is equipped with a bottom shell liner 10 for the bottom shell 2 as described above, and also with a protective liner 20 for protecting the driveshaft 6 from material hitting the driveshaft 6 after passing through the crushing gap G. This driveshaft liner 20 will now be described in detail with reference to FIGS. 5 to 9.

The driveshaft liner 20 is made up from three different sections which are mounted to the crusher in a particular order and disassembled therefrom in the reverse order. A first archway-shaped element 30 of the driveshaft liner 20 is provided for covering the driveshaft 6 from above in an area near the central hub 4—or, in this embodiment, for covering an existing steel cover 8 (cf. FIG. 1) of the drive shaft 6 from above in this area because the drive shaft 6 is not directly exposed to the crushed material. A second bridge-shaped element 40 of the driveshaft liner 20 is arranged above the first element 30 and is coupled to a ring-shaped steel sleeve 41 surrounding the central hub 4. Immediately adjacent to the first element 30 is a third element 50, also archway-shaped, for covering the driveshaft 6—or more particularly the steel cover 8—from above.

Figure 6:
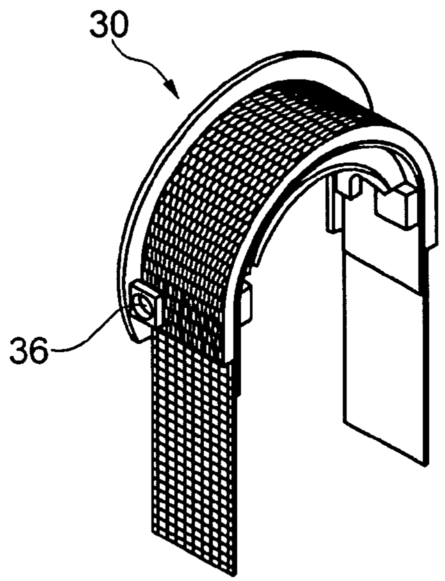
FIG. 6 shows a first element of the driveshaft liner.
Figure 6:
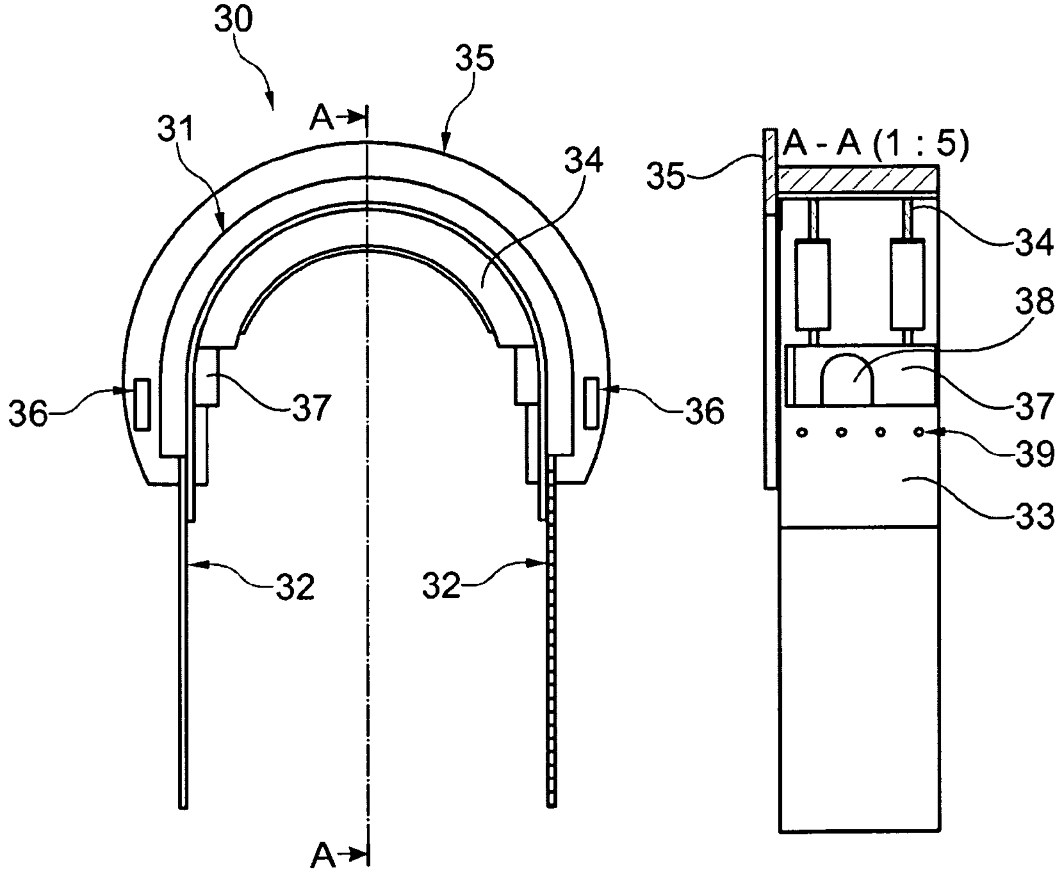

The first element 30 of the driveshaft liner 20 is illustrated in more detail in FIG. 6, which includes a perspective view, a front view as well as a sectional view along the line A-A in the front view. The element 30 is provided for covering a first portion of the driveshaft 6 from above. The section 30 includes a polymer-ceramics element which in this embodiment has the configuration of an archway, including an arch-shaped element 31 and two narrow plate-shaped extensions 32 extending vertically downwards from both ends of the arch 31. In the mounted state, the arch-shaped part 31 of the first element 30 will cover the drive shaft 6 from above, whereas the plate-shaped wall elements 32 will also guide the falling material past the drive shaft 6. The first element 30 generally extends in a direction along the driveshaft 6 in the mounted state.

In the area of the arch-shaped polymer-ceramics part 31, the first element 30 of the driveshaft liner 20 further includes a carrier structure supporting the polymer-ceramics element. The carrier structure is provided in the form of a metal frame, the shape and configuration of which is best apparent from the sectional view in FIG. 6: an inner frame part 33 supports the inner circumferential surface of the arch-shaped polymer-ceramics part 31. The inner frame part 33 is connected with the polymer-ceramics part 31 e.g. by gluing and/or using self-tapping screws as indicated at 39. Narrow reinforcing metal stays 34 are provided to the surface of the inner frame part 33 which faces in the direction of the drive shaft 6 in the mounted state.

An arch-shaped face plate 35 is provided to the front face of the element 30 which so as to face the central hub 4 in the mounted state. Outer brackets 36 are provided on a surface of the arch-shaped face plate 35 which faces away from the central hub 4 in the mounted state.

Inner brackets 37 are provided on an inner surface of the inner frame part 33. The inner brackets 37 include recesses which are adapted to become seated on matching protrusions, particularly protruding studs, provided on a supporting element within the crusher, such as the steel cover 8 of the drive shaft 6 which will be described once again in more detail below with reference to FIG. 9. As a consequence, the drive shaft liner 20 covers the steel cover which in turn covers the drive shaft 6.

Elements 33 to 38 form the said metal frame of the first element 30 of the drive shaft liner 20.

Figure 7:
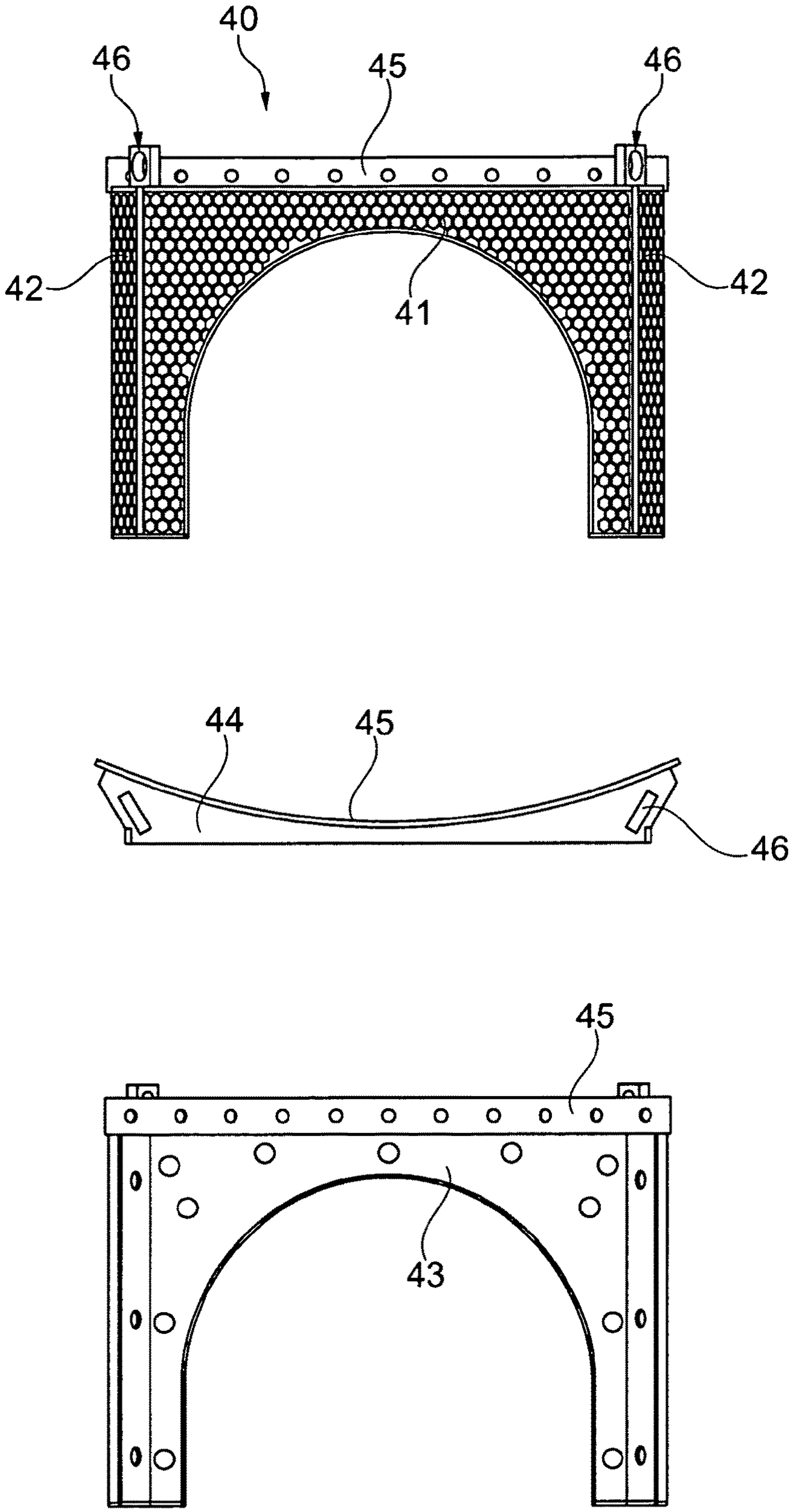
FIG. 7 shows a second element of the driveshaft liner.

The second element 40 of the driveshaft liner 20 is illustrated in more detail in FIG. 7 (front view, top view and rear view). The second element 40 includes three polymer-ceramics layers: a front face layer 41, which has a rectangular shape with a half circular cut-out for the drive shaft to extend through in the mounted state, and two rectangular plate-shaped side layers 42.

The polymer-ceramics layers 41, 42 are supported by a metal frame 43. The polymer-ceramics layers 41, 42 can e.g. be plug-welded onto this metal frame 43.

The metal frame 43 has a front surface which extends essentially perpendicular to a longitudinal axis of the drive shaft 6 in the mounted state. The first polymer-ceramics layer 41 is attached to the front surface. The metal frame also has a roof surface 44 extending at right angles to the front surface. The front edge of the roof surface 44, which is joined to the front surface, is straigth. The rear edge of the roof surface 44, which is joined to the central hub 4 in the mounted state, has a curvature adapted to the curvature of the outer circumferential surface of the central hub 4.

The metal frame 43 further includes two side surfaces to which the two polymer-ceramics elements 42 are attached. The side surfaces extend at right angles to the roof surface 44 and at an angle to the front surface equipped with the first polymer-ceramics layer 41.

A stay 45 is provided along the rear edge of the roof surface 44 of the frame 43. By means of this stay 45, the second element 40 of the driveshaft liner 20 can be fastened to the central hub 4 or a surrounding ring 41 thereof, respectively. This could e.g. be done by welding the stay 45 to the central hub 4, and/or by using fastening elements such as screws or bolts.

Brackets 46 are provided to an upper portion of the metal frame 43.

Figure 8:
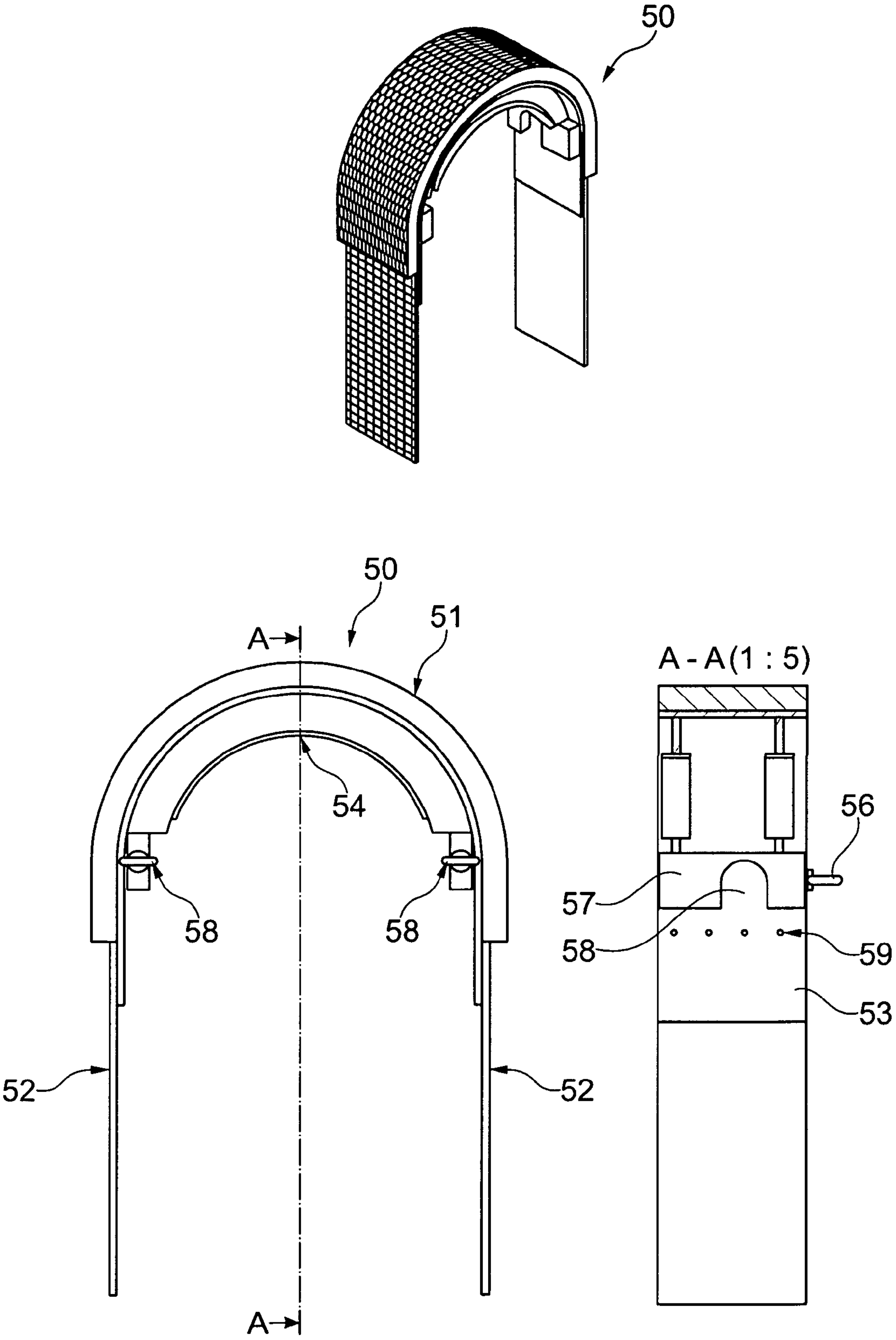
FIG. 8 shows a third element of the driveshaft liner.

The third element 50 of the driveshaft liner 20 is illustrated in more detail in FIG. 8. It is configured basically similar as the first element 30 illustrated in FIG. 6, i.e. includes a polymer-ceramics structure 51, 52 similar to the one 31, 32 of the first element 30, and metal frame parts 53, 54 similar to the metal frame parts 33, 34, including inner brackets 57 with recesses 58 to sit on a supporting structure such as the steel cover 8 of the drive shaft 6. Screws, which are also similar to the screws 39 of the first element 30, are designated 59. Other than in the case of the first element 30, the metal frame does not comprise the arch-shaped face plate 35 nor the brackets 36. Lifting eye bolts 56 are provided, though.

The brackets 36, 46 and the lifting eye bolts 56 are provided for the purpose of lifting the elements 30, 40 and 50 of the driveshaft liner 20, which can be relatively heavy, during installation and disassembly.

Figure 9:
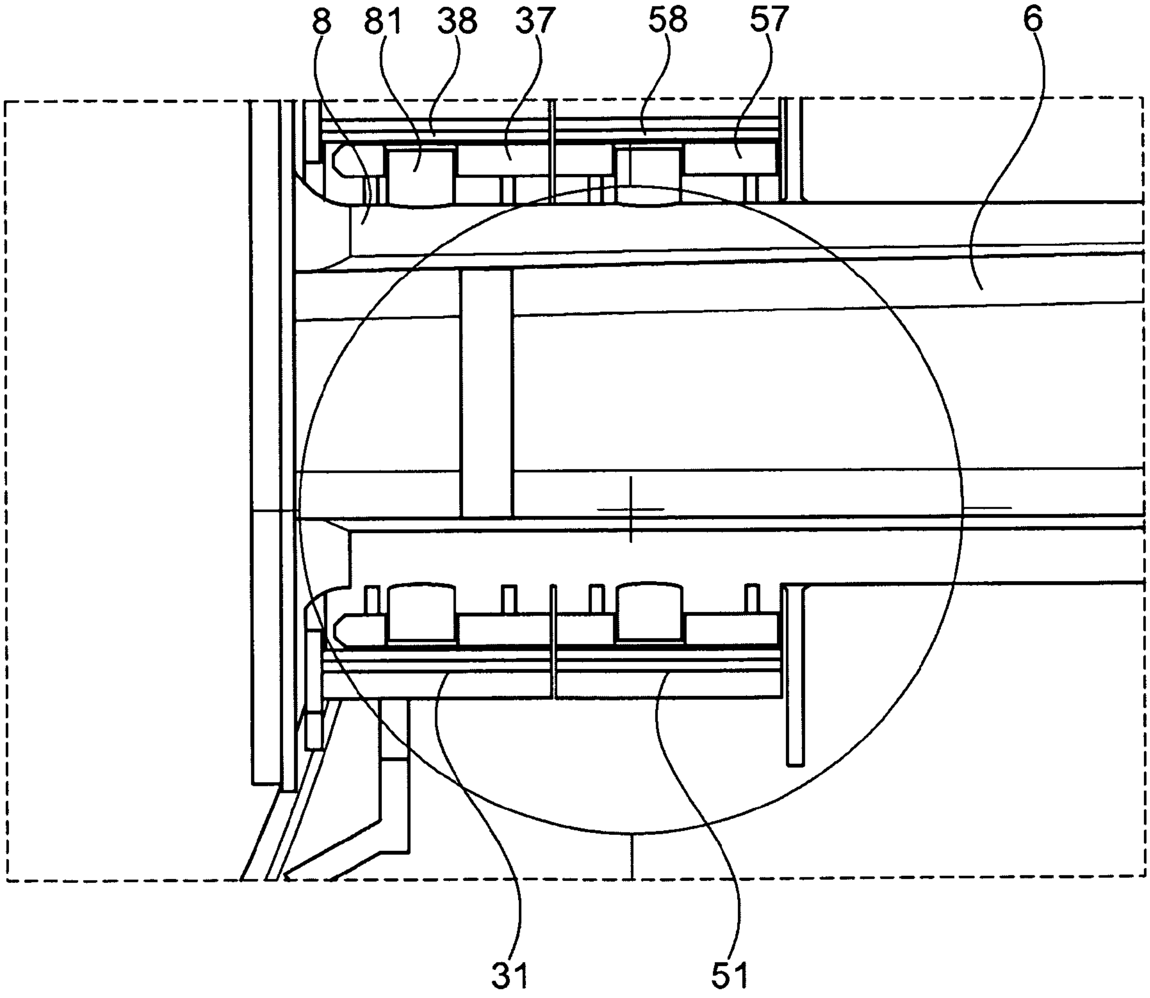
FIG. 9 illustrates a driveshaft from below in a state in which it is equipped with a driveshaft liner.

FIG. 9 shows the driveshaft 6 from below in a state in which it is equipped with the driveshaft liner 20 described above. The first element 30 and the third element 50 of the driveshaft liner 20 are illustrated including their respective polymer-ceramics elements 31, 51 and inner brackets 37, 57. Also illustrated is the above described steel cover 8. As explained above, recesses 38, 58 are formed in the inner brackets 37, 57. The recesses 38, 58 engage with short protruding studs 81 provided on the steel cover 8.

3. Locking Nut Liner

The protective liner of the present invention can be used for any arbitrary other structural element of the crusher which is subject to wear due to its contact with material passing the crusher. In order to mention a further possible example, reference is made once again to FIG. 1, which illustrates the locking nut 5 as another structural part within the crusher which can be equipped with a protective liner according to the invention. In this embodiment, the locking nut liner 80 is arranged so as to cover a cylindrical outer circumferential surface of the locking nut 5. The locking nut liner 80 is releasably fixed to the outer circumferential surface of the locking nut 5.

What is claimed is:

1. A crusher comprising:
- a main frame including a bottom shell;
- a crushing head mounted upon a main shaft, wherein a crushing gap is formed between an outer surface of the crushing head and an inner circumferential surface of a mantle provided within the main frame;
- a steel liner mounted to the bottom shell using a first connection and arranged below the mantle so as to cover and protect a structural element of the crusher which is subject to wear, the steel liner including an outer surface facing the bottom shell and an inner surface facing an interior of the bottom shell, the steel liner including a plurality of protruding portions that are formed as an integral part of or are fixed to the inner surface of the steel liner and extend from the inner surface of the steel liner;

a plurality of protective liner sections mounted to the steel liner using a second connection separate from the first connection such that the plurality of protective liner sections combine to form a protective liner, wherein each of the protective liner sections includes a plurality of through openings, wherein each of the plurality of through openings receives one of the plurality of protruding portions of the steel liner to support the protective liner section along the steel liner; and a plurality of liner clamps each positioned to engage one of the plurality of through openings and one of the plurality of protruding portions such that the plurality of protective liner sections are releasably fixed to and supported by the steel liner within the crusher, wherein at least a part of an outwardly directed surface of the protective liner constituting a wear surface, wherein each of the plurality of protective liner sections includes an elastic material layer and wear resistant inserts retained by the elastic material layer, wherein outwardly directed surfaces of the wear resistant inserts form part of the wear surface of the protective liner, wherein a surface area of the protective liner is smaller than a surface area of the steel liner so that the protective liner covers only part of the surface area of the steel liner.

2. The crusher of claim 1, wherein each of the plurality of protective liner sections are releasably fitted within the crusher by fastening the elastic material layer within the crusher.

3. The crusher of claim 1, wherein each of the plurality of protective liner sections further comprises at least one stiffening element, wherein the at least one stiffening element increases the stiffness of the elastic material layer in the vertical direction.

4. The crusher of claim 1, wherein an area of each of the plurality of protective liner sections including the through openings is devoid of wear-resistant inserts.

5. The crusher of claim 4, wherein each of the plurality of liner clamps are located in an area of the protective liner section which is devoid of wear-resistant inserts.

6. The crusher of claim 1, wherein the steel liner is integrally formed with or provided with hooks configured to support each of the plurality of protective liner sections on a lower edge opposite an upper edge that is near the plurality of through openings during assembly and/or during operation of the crusher.

7. The crusher of claim 1, wherein the steel liner is a bottom shell liner mounted to the inner circumferential surface of the bottom shell.

8. A crusher comprising:

a main frame;

a crushing head mounted upon a main shaft, wherein a crushing gap is formed between an outer surface of the crushing head and an inner circumferential surface of a mantle provided within the main frame;

a drive shaft arranged to impart a gyratory motion to the crusher head, wherein the main frame includes a bottom shell having a shaft opening for the drive shaft to pass through; and at least one protective drive shaft liner which is releasably fitted within the crusher and positioned to surround a portion of the drive shaft from above the drive shaft, at least a part of an outwardly directed surface of the protective drive shaft liner constituting a wear surface, wherein the at least one protective drive shaft liner comprises an elastic material layer and wear resistant inserts retained by the elastic material layer, wherein outwardly directed surfaces of the wear resistant inserts form part of the wear surface of the at least one protective drive shaft liner.

9. The crusher of claim 8, wherein the main shaft is mounted within a central hub, wherein at least one section of the drive shaft liner is fixed to the central hub.

10. The crusher of claim 8, wherein the drive shaft liner includes a first section extending along a portion of the drive shaft extending within the bottom shell.

* * * * *